J. B. Tipton.
Cultivator.

N° 87,080.    Patented Feb. 16, 1869.

Witnesses:
John P. Jacob
James P. _____

Inventor:
J. B. Tipton
Chipman Hosmer & Co.
Attys

JOHN B. TIPTON, OF PEORIA, ILLINOIS.

Letters Patent No. 87,080, dated February 16, 1869.

IMPROVEMENT IN CULTIVATORS.

The Schedule referred to in these Letters Patent and making part of the same.

*To all whom it may concern:*

Be it known that I, JOHN B. TIPTON, of Peoria, in the county of Peoria, and State of Illinois, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a plan view of my cultivator;

My invention relates to cultivators, and

It consists in providing novel and efficient means for raising the plows, or moving them to the right or left, and of suspending them from the ground for purposes of transportation.

Figure 1:
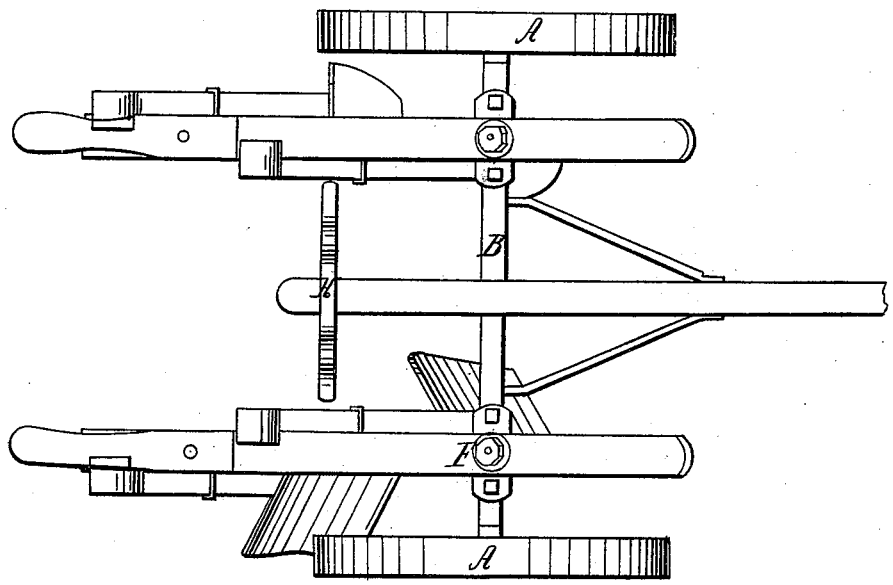
Figure 2:
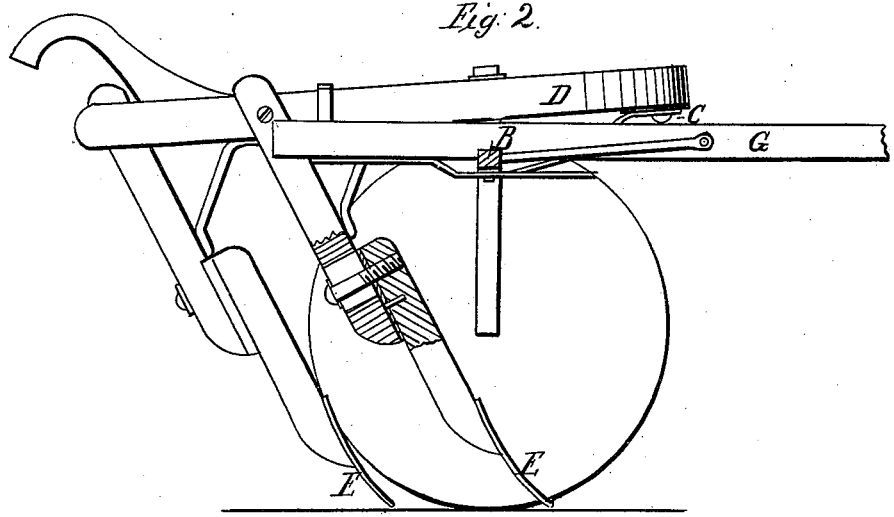
Figure 2 is a sectional view thereof.

The letters A of the drawings represent the sulky-carriage wheels of my cultivator; and Letter B is the axle, constructed in the form shown on fig. 2, and resembling two cranks, to the handles of which the wheels are attached, and the main shaft extending upward to a point near the upper rims of the wheels. That part of the axle which corresponds to the main shaft or crank, constitutes the bar of the axle between the wheels, and serves as a rest for the plow-beams, as hereinafter mentioned.

Figure 3:
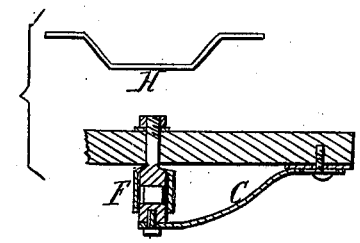
Figure 3 is a detail.

The letters C are springs, extending from the lower side of the axle to the front end of the plow-beams, to which they are connected by screws, in the manner shown on fig. 3.

The front ends of these springs are slotted, and the screws above named are adjusted to the beams through such slots. These slots and screws serve as aids in adjusting the position of the plows, as hereinafter mentioned.

The letters D are the plow-beams, and the letters E are the plows, attached thereto in the manner represented.

The plow-beams are attached to the top of the axle by means of ball and socket-joints, as shown on fig. 3, marked F.

The letter G represents the tongue, or neap, of the carriage, and the letter H is a rest, or support, attached to the rear end thereof, as shown. This rest serves to hold the plows above the ground when moving the cultivator from place to place.

Whenever the operator raises the rear ends of the plow-beams, the ball-and-socket joints on the axle, and the slotted springs C, are so actuated as to furnish but little resistance, and thereby enable the manufacturer to dispense with the complicated and expensive machinery ordinarily used for that purpose. These springs and joints also allow the plows to be moved sidewise, at the will of the operator.

What I claim as my invention, and desire to secure by Letters Patent, is—

1. In combination with a cultivator, the slotted springs C, and ball-and-socket joints F, constructed and operating substantially as described.

2. A cultivator, having ball-and-socket joints F, springs C, elevated axle, as described, and rest H, constructed, arranged, and operating substantially as herein specified In testimony that I claim the above, I have hereunto subscribed my name, in the presence of two witnesses.

JOHN B. TIPTON.

Witnesses:
L. H. KING,
JOHN A. GRAY.